United States Patent
Hessel et al.

(10) Patent No.: US 7,123,894 B2
(45) Date of Patent: Oct. 17, 2006

(54) DYNAMIC RANGE EXTENSION SYSTEM AND METHOD

(75) Inventors: Clifford Hessel, Rochester, NY (US); Christopher D. Mackey, Spencerport, NY (US)

(73) Assignee: Harris Corporation, Melbourne, FL (US)

( * ) Notice: Subject to any disclaimer, the term of this patent is extended or adjusted under 35 U.S.C. 154(b) by 548 days.

(21) Appl. No.: 10/319,622

(22) Filed: Dec. 16, 2002

(65) Prior Publication Data

US 2004/0116092 A1   Jun. 17, 2004

(51) Int. Cl.
  *H04B 1/10* (2006.01)
(52) U.S. Cl. .................... 455/303; 375/349; 375/355; 455/311
(58) Field of Classification Search ............. 455/303, 455/305, 312, 311, 232.1, 234.1, 349, 355; 375/349, 345; 341/139
See application file for complete search history.

(56) References Cited

U.S. PATENT DOCUMENTS

| 5,422,643 | A | * | 6/1995 | Chu et al. ................. 341/141 |
| 5,714,956 | A | * | 2/1998 | Jahne et al. .............. 341/155 |
| 6,100,832 | A | * | 8/2000 | Uesugi ...................... 341/139 |
| 6,317,065 | B1 | * | 11/2001 | Raleigh et al. ............ 341/139 |
| 6,445,328 | B1 | * | 9/2002 | Francis ...................... 341/155 |

* cited by examiner

*Primary Examiner*—Quochien B. Vuong
*Assistant Examiner*—Christian A. Hannon
(74) *Attorney, Agent, or Firm*—Duane Morris LLP

(57) ABSTRACT

A digital radio frequency receiver capable of receiving RF signals at a plurality of signal strengths thereby extending the dynamic range of the receiver without introducing a control loop while allowing a stable gain control algorithm to be implemented in software is described. Various embodiments of a digital radio receiver process a range of signals outside normal analog to digital converter capabilities and bypass the delays resulting from gain control loops.

24 Claims, 3 Drawing Sheets

DYNAMIC RANGE EXTENSION SYSTEM AND METHOD

BACKGROUND

Radio systems are intended to handle a wide range of signal strengths. In a digital radio system the analog to digital converter ("ADC") places a constraint on the range of signals that may be handled. The range of signals that can be reliably transmitted in a device is described as the dynamic range. Digitizing electronics are often carefully designed so the dynamic range encompasses the range of information signals utilized by the device. Thus an ADC trying to record, with acceptable resolution, light pulses from low magnitude signals such as minimum ionizing tracks and from higher magnitude signals such as energetic showers in a calorimeter, will necessarily need a large information range (usually given as a word length, e.g. 10 or more bits). The dynamic range is sometimes expressed as the ratio between the highest and lowest signal and may be measured in decibels (i.e. the logarithmic expression of this ratio).

In prior art methods, the effective range of an ADC may be extended by using a non-linear response. This approach extends the dynamic range, preserving all relevant information; however, some processing is required so that the information is translated back to a linear scale. For a non-linear response, the error given by the least count (i.e. the smallest step by which digitized signals can be different) does not translate into a constant absolute error, resulting in different degrees of resolution dependent upon signal strength.

A prior art digital radio system uses two gain stages to extend the dynamic range of the ADC. This prior art system takes samples only during hopping where a hop's worth of samples are accumulated for each stream and a choice of which stream to use is then determined at the end of a hop. In this prior art system the samples are taken at different times for each stage. Consequently, the streams cannot be combined.

Other prior art approaches to extend the dynamic range of an ADC employ automatic gain control (AGC) loops. Prior art radios employing this method are designed to implement a plurality of communication techniques each of which imposes unique requirements on the AGC used. In the prior art, attempts have been made to implement AGC algorithms in software so that each waveform might have a unique algorithm customized to its particular needs. However, the software generally introduces delays into the control loop making it nearly impossible to implement stable and effective gain control loops.

In view of the present need and the deficiencies of the prior art, it is an object of an embodiment of the present invention to provide a novel method and system to extend the dynamic range of a digital system without introducing a control loop and to allow a quasi, non-causal and stable gain control algorithm to be implemented in software.

It is also an object of an embodiment of the present invention to provide a radio receiver to handle a range of signals that is outside the capabilities of current analog to digital converters.

It is another object of an embodiment of the present invention to provide a radio frequency receiver for receiving a plurality of signal strengths wherein said radio receiver contains a plurality of gain streams, an ADC, a controller and a digital signal processor. Furthermore, said gain streams contain an amplifier applying a different incremental gain to the communication signal.

It is yet another object of an embodiment of the present invention to provide an improvement of an apparatus for converting an analog signal to a digital signal where the apparatus includes a quantifier with a fixed dynamic range, a DSP and at least two fixed gain amplifying parallel branches. Wherein, each said fixed gain amplifying branches amplify the analog signal. The improvement comprises using gain amplifiers that have different gains in the parallel branches.

It is still another object of an embodiment of the present invention to provide a method to extend the dynamic range of a radio receiver without a gain control loop. The method includes the steps of obtaining a communication signal, amplifying the signal at different gains and converting the signal to digital data.

It is still yet another object of an embodiment of the present invention to provide a novel signal processing apparatus for recovering information from an analog input signal and producing a digital output signal representative of said information. The apparatus including comprising plural parallel circuits each adapted to receive said analog input signal and produce therefrom a quantized signal which is amplified by an amount different than the other said parallel circuits. The apparatus also including a logic circuit for receiving the quantized signals from the parallel circuits and recovering said information from the quantized signals to thereby produce a digital output signal representative of said information.

It is an additional object of an embodiment of the present invention to provide a novel improvement to a signal processing apparatus for recovering information from an analog input signal and producing a digital output signal representative of said information including a signal processing circuit including a quantizer with a fixed dynamic range. The improvement including plural parallel circuits replacing said signal processing circuit wherein said plural parallel circuits are each-adapted to receive said analog input signal and produce therefrom a quantized signal which is amplified by an amount different than the other said parallel circuits. The improve signal processing apparatus also including a logic circuit for receiving the quantized signals from the parallel circuits and recovering said information from the quantized signals to thereby produce a digital output signal representative of said information.

It is still an additional object of an embodiment of the present invention to provide a novel improvement for a signal processing apparatus for recovering information from an analog input signal and producing a digital output signal representative of said information, wherein said apparatus comprises a signal processing circuit including a quantizer with a fixed dynamic range and an AGC loop. The improved signal processing apparatus including plural parallel circuits replacing said signal processing circuit wherein said plural parallel circuits are each adapted to receive said analog input signal and produce therefrom a quantized signal which is amplified by an amount different than the other said parallel circuits. The improved signal processing apparatus also including a logic circuit for receiving the quantized signals from the parallel circuits and recovering said information from the quantized signals to thereby produce a digital output signal representative of said information.

These and many other objects and advantages of the present invention will be readily apparent to one skilled in the art to which the invention pertains from a perusal of the claims, the appended drawings, and the following detailed description of the preferred embodiments.

DETAILED DESCRIPTION

Embodiments of the present invention enable multiple synchronized streams of digital data sampled at different gain levels various gains to be available to the digital signal processor (DSP). The DSP may utilize the multiple streams in various processes. The DSP may choose one stream from the choices or perform a weighted sum of streams to produce a greater resolution. The methods selected may necessarily be unique to the particular waveforms and may be implemented by software algorithms. Since all the sample streams are supplied to the DSP, no control loop is needed to maintain the signal within the dynamic range of the ADC. An indicator of whether or not the amplified signal of a gain stream is outside the dynamic range of the ADC may be advantageously included in the sample stream. The implementation of the invention therefore provides an instantaneous dynamic range that is limited only by the number of gain streams the designer chooses to support.

Figure 1:
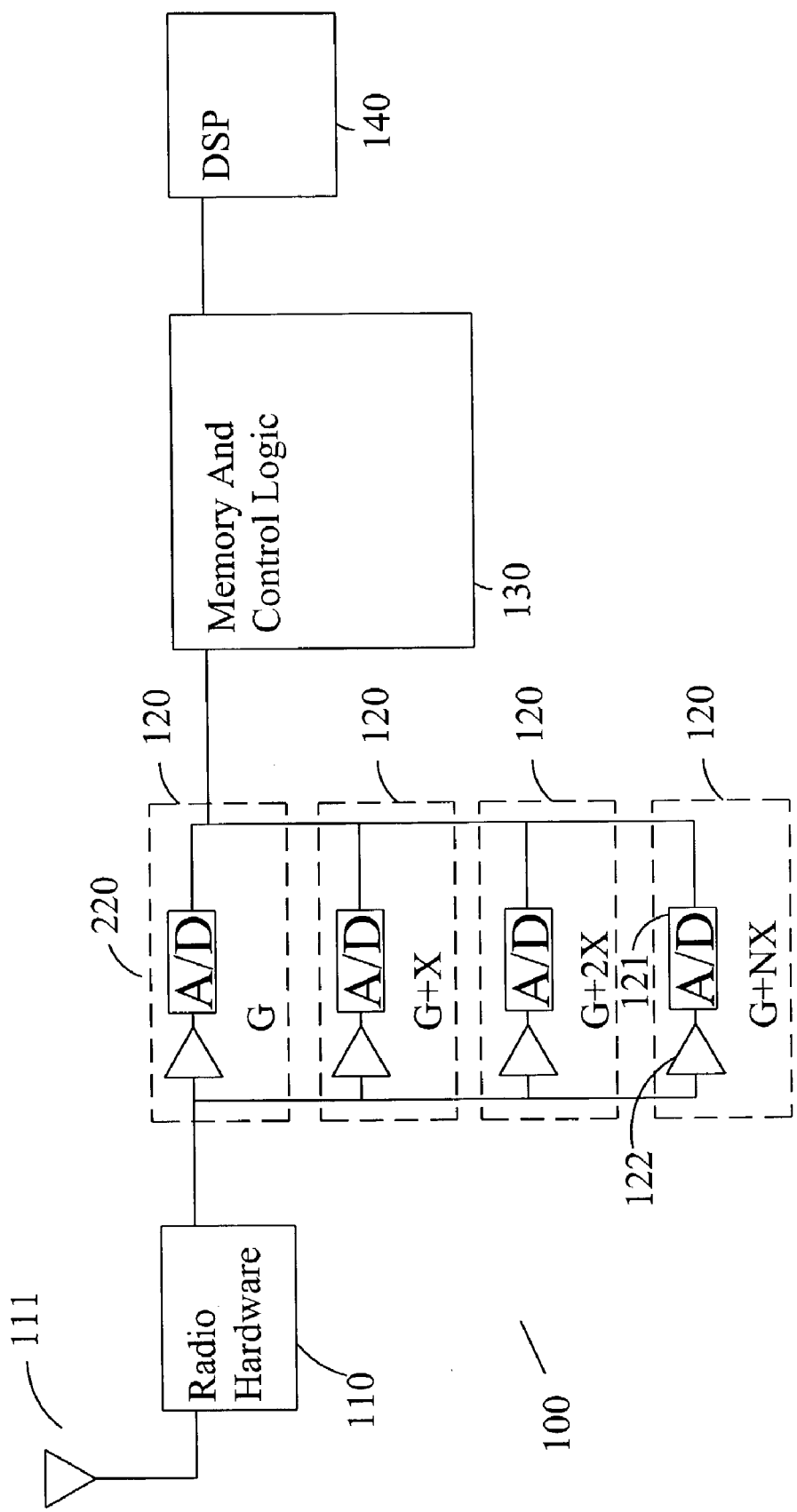
FIG. 1 is a functional diagram of a receiver according to an embodiment of the present invention.

An embodiment of the invention is shown in FIG. 1. The receiver 100 comprises radio hardware 110 including circuitry commonly used such as oscillators and filters. The radio hardware shown in FIG. 1 also includes an antennae 111; however, the communication signals may be equally obtained by a hard wired connection such as a cable or similar means. The obtained communication signal is in the form of an analog signal. The signal is supplied to a plurality of parallel gain streams 120. Each of the parallel gain streams 120 in the embodiment of FIG. 1 contains an amplifier 122 and an ADC 121. The amplifiers provide a fixed gain to the communication signal that is different in each gain stream. The gain function for the gain stream n(i) is nominally described as $G+(i-1)x$, where G is a constant, x is a predetermined amount of gain, and n(i) is the $i^{th}$ gain stream from the group of N gain streams. The embodiment in FIG. 1 shows 4 gain streams; however, any number of gain streams may be implemented in embodiments of the present invention.

The amplified communication signals in each of the branches (streams) are synchronously converted in each stream by the ADC 121, resulting in N synchronized digital signals streams representing the analog communication signal at N different gains. These digital signals are supplied to a controller 130 which contains memory and control logic. The controller provides the synchronized digital signals to the DSP 140.

The implementation may be affected by embodiments utilizing a single ADC, multiple sample and hold circuits and a multiplexer (demultiplexer) to provide the plurality of streams to the controller 130, granted that the product of the signal streams sample rate and the number of gain streams is smaller or equal to the maximum sample rate of the ADC. This embodiment is shown in FIG. 2.

Figure 2:
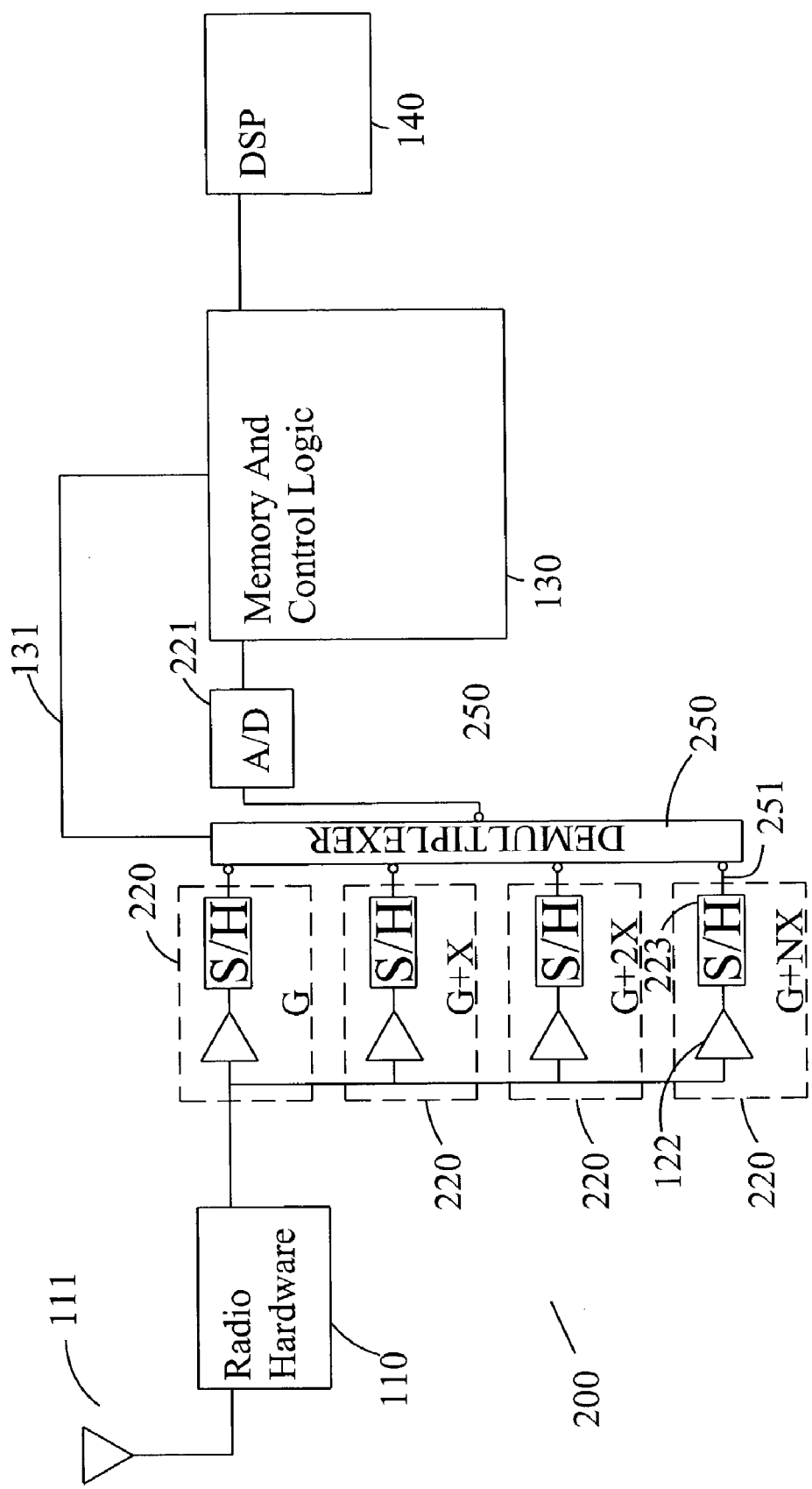
FIG. 2 is a functional diagram of a receiver with a multiplexer according to an embodiment of the present invention.

The parallel gain streams in an embodiment shown in FIG. 2 contain amplifiers 122 and sample and hold (S/H) circuits 223. The amplified communication signals supplied by the amplifiers 122 are sampled by the S/H circuits 223 and the sampled amplitude is supplied to an input gate 251 of a demultiplexer 250 until the next sample is taken. The sample rate of the S/H circuit is at least equal to the symbol rate of the communication signal. The demultiplexer sequentially connects each of the parallel gain streams 220 to the ADC 221 at least once per sample. The ADC converts each sample communication signal into a corresponding digital signal for processing in the controller 130. The sample rate of the ADC is at least equal to the product of the symbol rate and the number of parallel gain streams N. The operation of the demultiplexer is controlled by the controller 130 via connection 131. The memory of the controller 130 contains N digital signals for each increment sampled by the S/H circuits 223. The stored digital signals in the controller 130 are thus available for use in the DSP 140. Thus the entire communication signal is available in digital form at N different gains.

Figure 3:
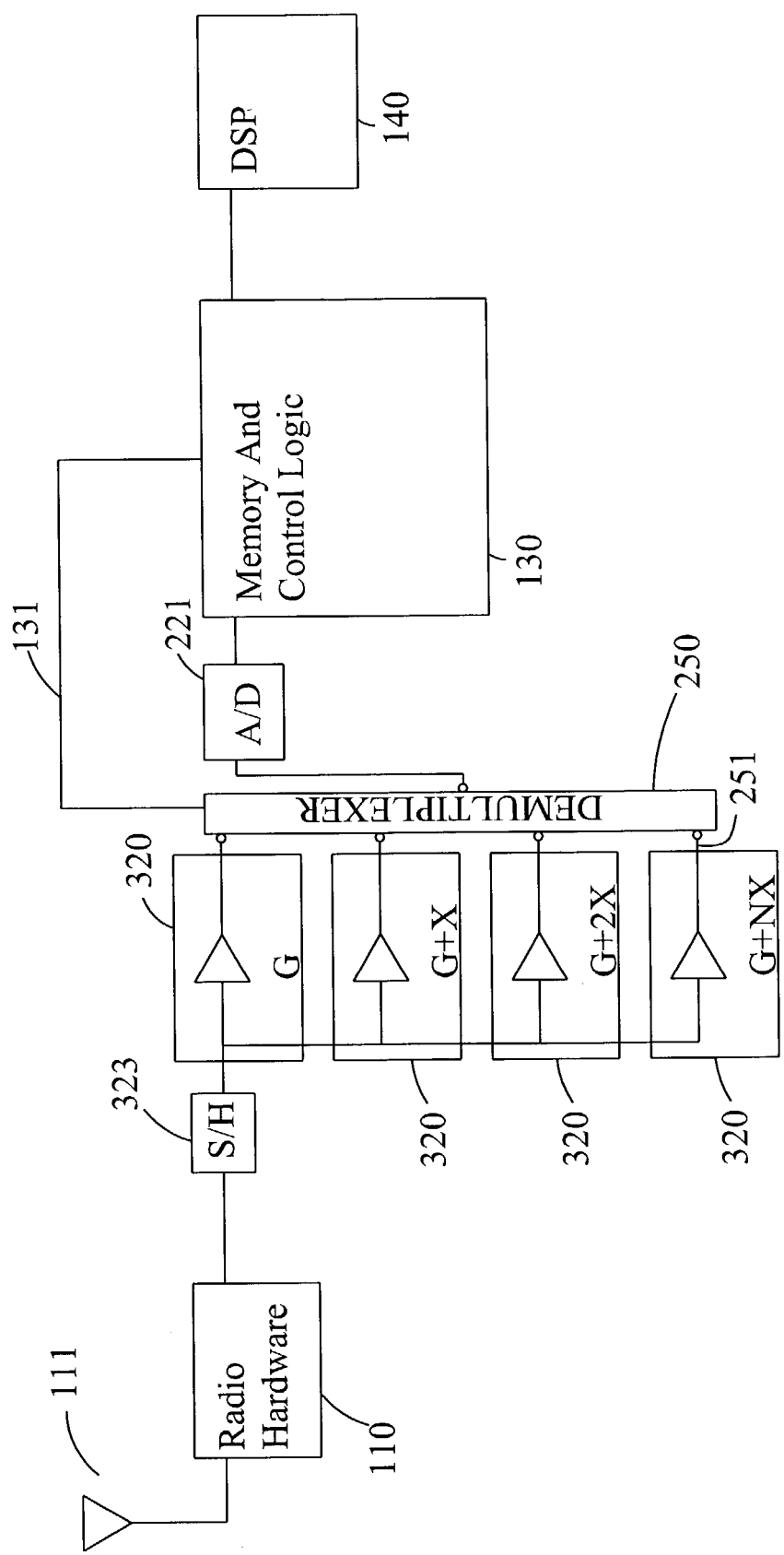
FIG. 3 is a functional diagram of a receiver with a single sample and hold circuit according to an embodiment of the present invention.

Similarly, a single sample and hold circuit may precede the gain stages as shown in FIG. 3, if the dynamic range of the sample and hold circuit does not limit performance. An embodiment shown in FIG. 3 includes parallel gain streams 320 containing only amplifiers 122. A S/H circuit 323 samples the communication signal and provides the sample to each of the parallel gain streams 320. The gain streams amplify the sample in the same manner as described above. A demultiplexer 250 sequentially connects each of the gain streams to the ADC 221 for digital conversion. Again in this embodiment the sample rate of the ADC 221 must be equal or greater than the product of the symbol rate and the number of gain streams N.

The controller 130 in embodiments of the invention determines which, if any, of the gain stream signals are outside of the dynamic range of the ADC 221. The digital signals resulting from those gain streams outside of the dynamic range are designated so as to be differentiated from the gain streams that are within the dynamic range. The digital data associated with a gain stream outside of the dynamic range may then be discarded or weighted by the controller 130 and DSP 140 in order to facilitate accurate information recovery from the digital signals.

The control logic of the controller 130 and the processing of the DSP 140 may be advantageously established through software algorithms applicable to various signal communication techniques capable of being received by the receiver 100.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A radio receiver for receiving a radio frequency signal comprising:
   a plurality of gain streams, each including an amplifier for processing the RF signal;
   at least one ADC;
   a controller; and
   a digital signal processor;
   a sample and hold circuit preceding the plurality of gain streams;
   wherein for each of said plural gain streams the amplifier provides an amount of gain to the RF signal that is different than the amount of gain applied to the RF signal in the other gain streams to thereby create an amplified signal;

wherein the amplified signals from the plural gain streams are converted to plural digital signals by said at least one ADC and wherein the plural digital signals are input to said controller for processing by said digital signal processor.

2. The radio receiver of claim 1 further comprising a plurality of sample and hold circuits and a multiplexer.

3. The radio receiver of claim 1 wherein the ADC sample rate is greater or equal to the product of the symbol rate of the signal and the number of streams N.

4. The radio receiver of claim 1 wherein each of the plural digital signals are received in the controller.

5. In a radio receiver comprising at least one ADC for converting analog signals to digital signals, a controller and a DSP for processing the digital signals, a method of providing an instantaneous extended dynamic range comprising the steps of:

sampling a common signal in a sample and hold circuit;
in a plurality of parallel gain streams N applying an incremented gain $G +(i-1)X$ to the common signal thereby creating N synchronized amplified signals;
converting the N synchronized amplified signals to N digital synchronized signals by the at least one ADC; and,
receiving the N digital synchronized signals in the controller for use by the DSP.

6. The method of claim 5, wherein the step of converting is accomplished by an ADC in each of the parallel gain streams N.

7. The method of claim 5, wherein the step of converting is accomplished by one ADC, one parallel signal stream at a time.

8. The method of claim 7, wherein each of the N synchronized amplified signals are sampled and multiplexed to the ADC.

9. The method of claim 7, wherein the signal is sampled and multiplexed.

10. A digital radio system comprising:
a receiver for obtaining a communication signal;
a plurality of amplifying means for providing a first set of synchronized signals, the first set of synchronized signals comprising the communication signal at a plurality of different predetermined gains; comprising a sample and hold circuit preceding the plurality of amplifying means;
at least one converting means for converting the first set of synchronized signals into a second set of synchronized digital signals; and,
a means for digital signal processing.

11. The radio system of claim 10 further comprising a plurality of sample and hold circuits and a multiplexer.

12. The radio system of claim 10, wherein the at least one converting means has a sample rate greater or equal to the product of the symbol rate of the signal and the number of signals in the first set of synchronized signals.

13. The radio system of claim 10, wherein each of the second set of synchronized digital signals are received by the means for digital signal processing.

14. A signal processing apparatus for recovering information from an analog input signal and producing a digital output signal representative of said information, comprising:

plural parallel circuits each adapted to receive said analog input signal and produce therefrom a signal which is amplified by an amount different than the other said parallel circuits;
a quantizer for producing quantized signals; and
a logic circuit for receiving the quantized signals from and recovering said information from the quantized signals to thereby produce a digital output signal representative of said information;
wherein the plural parallel circuits produce amplified signals and said amplified signals are demultiplexed and fed into the single quantizer.

15. The signal processing apparatus of claim 14 wherein the plural parallel circuits comprise an amplifier.

16. The signal processing apparatus of claim 14 wherein the quantizer has a fixed dynamic range.

17. The signal processing apparatus of claim 14 wherein the quantizer is an ADC.

18. The signal processing apparatus of claim 14 wherein quantized signals are synchronized.

19. The signal processing apparatus of claim 14 wherein the signal processing apparatus is a digital radio system.

20. The signal processing apparatus of claim 14 wherein the plural parallel circuits further comprise an amplifier and S/H circuits.

21. In a signal processing apparatus for recovering information from an analog input signal and producing a digital output signal representative of said information, wherein said apparatus comprises a signal processing circuit including a quantizer with a fixed dynamic range, the improvement comprising:

plural parallel circuits replacing said signal processing circuit wherein said plural parallel circuits are each adapted to receive said analog input signal and produce therefrom an amplified signal which is amplified by an amount different than the other said parallel circuits;
a quantitizer for producing quantized signals from the amplified signals; and
a logic circuit for receiving the quantized signals from the parallel circuits and recovering said information from the quantized signals to thereby produce a digital output signal representative of said information;
wherein the amplified signals are demultiplexed from the plural parallel circuits and fed into the quantizer.

22. In a signal processing apparatus for recovering information from an analog input signal and producing a digital output signal representative of said information, wherein said apparatus comprises a signal processing circuit including a quantizer with a fixed dynamic range and an AGC toop, the improvement comprising:

plural parallel circuits replacing said signal processing circuit wherein said plural parallel circuits are each adapted to receive said analog input signal and produce therefrom an amplified signal which is amplified by an amount different than the other said parallel circuits;
a quantitizer for producing quantized signals from the amplified signals; and
a logic circuit for receiving the quantized signals from the parallel circuits and recovering said information from the quantized signals to thereby produce a digital output signal representative of said information;
wherein the amplified signals are demultiplexed from the plural parallel circuits and fed into the quantizer.

23. A digital radio system for receiving an RF communication signal comprising:
a plurality of parallel gain streams, each of the plurality of parallel gains streams comprising an amplifier with a different gain than each of the other parallel gain streams and a sample and hold circuit, wherein each of the plurality of parallel gain streams receives the RF communication signal, amplifies the RF communication signal with the amplifier creating a plurality of amplified signals and samples and holds the amplified signals with the sample and hold circuit;

an ADC, the ADC converting the plurality of amplified signals to a plurality of digital signals;

a demultiplexer operably connected between the plurality of gain streams and the ADC, the demultiplexer providing the amplified signals held in the sample-and-hold circuits to the ADC.

a controller operably connected to the demultiplexer and the ADC, the controller collecting the plurality of digital signals from the ADC and controlling the operation of the demultiplexer; and, a digital signal processor, the digital signal processor processing the digital signals received from the controller to extract the information contained in the RF communication signal.

24. A digital radio system for receiving an RF communication signal comprising:

a sample an hold circuit with a sample rate greater or equal to the symbol rate of the RF communication signal;

a plurality of parallel gain streams, each of the plurality of parallel gains streams comprising an amplifier with a different gain than each of the other parallel gain streams wherein each of the plurality of parallel gain streams receives the RF communication signal samples from the sample and hold circuit, amplifies the samples with the amplifier creating a plurality of amplified samples;

an ADC, the ADC converting the plurality of amplified samples to a plurality of digital signals;

a demultiplexer operably connected between the plurality of gain streams and the ADC, the demultiplexer providing the amplified samples from the gain streams to the ADC;

a controller operably connected to the demultiplexer and the ADC, the controller collecting the plurality of digital signals from the ADC and controlling the operation of the demultiplexer; and, a digital signal processor, the digital signal processor processing the digital signals received from the controller to extract the information contained in the RF communication signal.

* * * * *